US012259470B2

(12) United States Patent
Yamashita et al.

(10) Patent No.: US 12,259,470 B2
(45) Date of Patent: Mar. 25, 2025

(54) OBJECT DETECTION DEVICE, VEHICLE, METHOD OF SETTING WAVE RECEIVING PERIOD IN OBJECT DETECTION DEVICE, AND METHOD OF SETTING DETECTION SENSITIVITY IN OBJECT DETECTION DEVICE

(71) Applicant: Panasonic Intellectual Property Management Co., Ltd., Osaka (JP)

(72) Inventors: Hiroki Yamashita, Kanagawa Ken (JP); Atsushi Seki, Kanagawa Ken (JP)

(73) Assignee: PANASONIC AUTOMOTIVE SYSTEMS CO., LTD., Kanagawa (JP)

(*) Notice: Subject to any disclaimer, the term of this patent is extended or adjusted under 35 U.S.C. 154(b) by 282 days.

(21) Appl. No.: 17/703,363

(22) Filed: Mar. 24, 2022

(65) Prior Publication Data
US 2022/0317295 A1 Oct. 6, 2022

(30) Foreign Application Priority Data

Mar. 30, 2021 (JP) .................................. 2021-058242
Mar. 30, 2021 (JP) .................................. 2021-058640

(51) Int. Cl.
*G01S 15/931* (2020.01)
*G01S 13/42* (2006.01)
(Continued)

(52) U.S. Cl.
CPC ............ *G01S 15/931* (2013.01); *G01S 13/42* (2013.01); *G01S 13/862* (2013.01);
(Continued)

(58) Field of Classification Search
CPC ...... G01S 15/931; G01S 13/42; G01S 13/862; G01S 13/931; G01S 2013/93275;
(Continued)

(56) References Cited

U.S. PATENT DOCUMENTS 10,977,944 B2  4/2021  Baba et al.
11,014,566 B2  5/2021  Maeda et al.
(Continued)

FOREIGN PATENT DOCUMENTS

JP   2005-056336 A   3/2005
JP   2012-018613 A   1/2012
(Continued)

OTHER PUBLICATIONS

Japanese Office Action for family member JP2021-058640 dated Apr. 9, 2024, together with an English translation.
(Continued)

*Primary Examiner* — Farzana Hossain
(74) *Attorney, Agent, or Firm* — GREENBLUM & BERNSTEIN, P.L.C.

(57) ABSTRACT

An object detection device according to the present disclosure, installed in a vehicle, includes a plurality of ranging sensors and each including a transmitter configured to transmit ultrasonic waves and a receiver configured to receive reflected waves of the ultrasonic waves transmitted by the transmitter and reflected by an object around the vehicle, and processing circuitry configured to detect the object around the vehicle based on the reflected waves received by the receiver during a wave receiving period until a predetermined period of time elapses from transmission of the ultrasonic waves by the transmitter. The processing circuitry is configured to acquire an imaged image imaged by an in-vehicle camera that images surroundings of the vehicle. The processing circuitry is configured to determine whether a specific object is contained based on the imaged image. The processing circuitry is configured to set the wave receiving period from a first wave receiving period to a second wave receiving period longer than the first wave receiving period when the specific object is determined to be contained in the imaged image.

18 Claims, 5 Drawing Sheets

(51) Int. Cl.
  *G01S 13/86* (2006.01)
  *G01S 13/931* (2020.01)
  *G06V 20/58* (2022.01)
(52) U.S. Cl.
  CPC ............ *G01S 13/931* (2013.01); *G06V 20/58* (2022.01); *G01S 2013/93275* (2020.01); *G01S 2015/938* (2013.01)
(58) Field of Classification Search
  CPC .... G01S 2015/938; G01S 17/86; G01S 7/529; G01S 7/5276; G01S 15/08; G01S 15/86; G01S 15/878; G01S 13/865; G01S 13/867; G01S 13/87; G01S 17/931; G01S 2013/9318; G01S 2013/9319; G01S 2013/93271; G01S 2013/93272; G06V 20/58; G06V 20/56
  See application file for complete search history.

(56) References Cited

U.S. PATENT DOCUMENTS

| | | | | |
|---|---|---|---|---|
| 2012/0327239 | A1* | 12/2012 | Inoue | G08G 1/165 348/148 |
| 2015/0323668 | A1 | 11/2015 | Heimberger et al. | |
| 2019/0031100 | A1 | 1/2019 | Lee et al. | |
| 2019/0276030 | A1* | 9/2019 | Maeda | G01S 7/53 |
| 2020/0055494 | A1* | 2/2020 | Baba | G01S 13/931 |
| 2020/0057897 | A1* | 2/2020 | Matsuura | G01S 15/08 |
| 2020/0298844 | A1* | 9/2020 | Ikuta | G01S 13/931 |

FOREIGN PATENT DOCUMENTS

| | | |
|---|---|---|
| JP | 2015-121959 A | 7/2015 |
| JP | 2015-532712 A | 11/2015 |
| JP | 2018-072105 A | 5/2018 |
| JP | 2018-081050 A | 5/2018 |
| JP | 2018-106486 A | 7/2018 |
| JP | 2020-008486 A | 1/2020 |
| JP | 6649865 B2 | 2/2020 |
| WO | WO2011/145141 A1 | 11/2011 |

OTHER PUBLICATIONS

Japanese Office Action for family member JP2021-058242 dated May 7, 2024, together with an English translation.
Japanese Notice of Allowance for family member JP2021-058242 dated Aug. 27, 2024, together with an English translation.

* cited by examiner

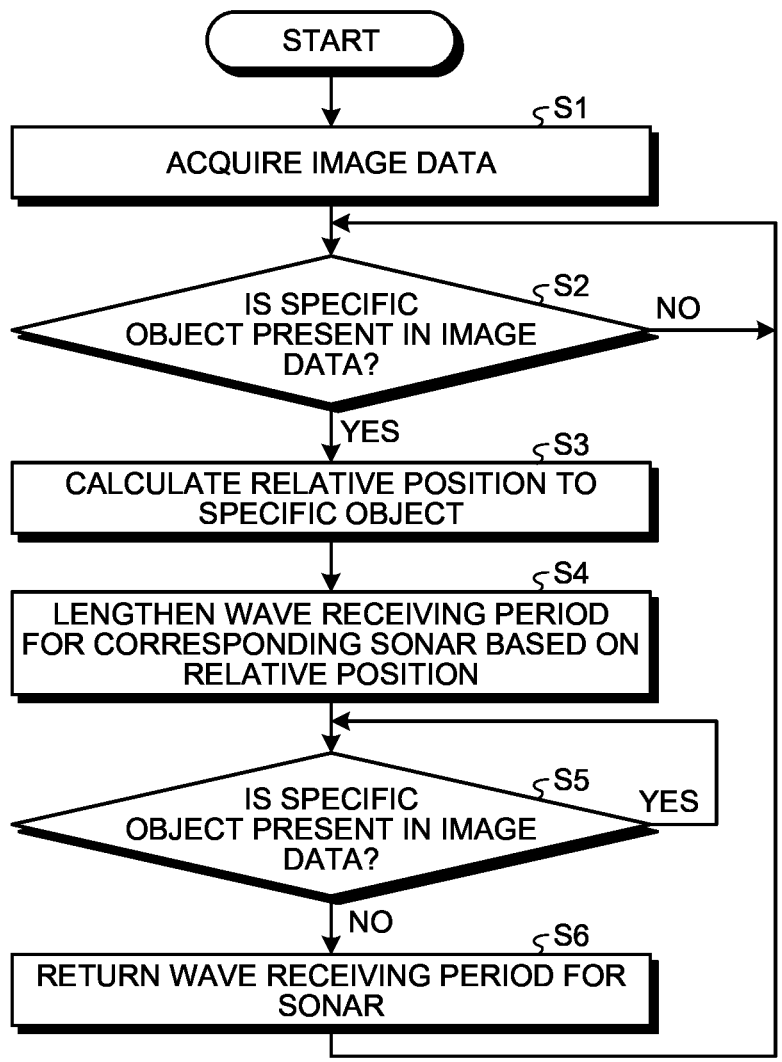
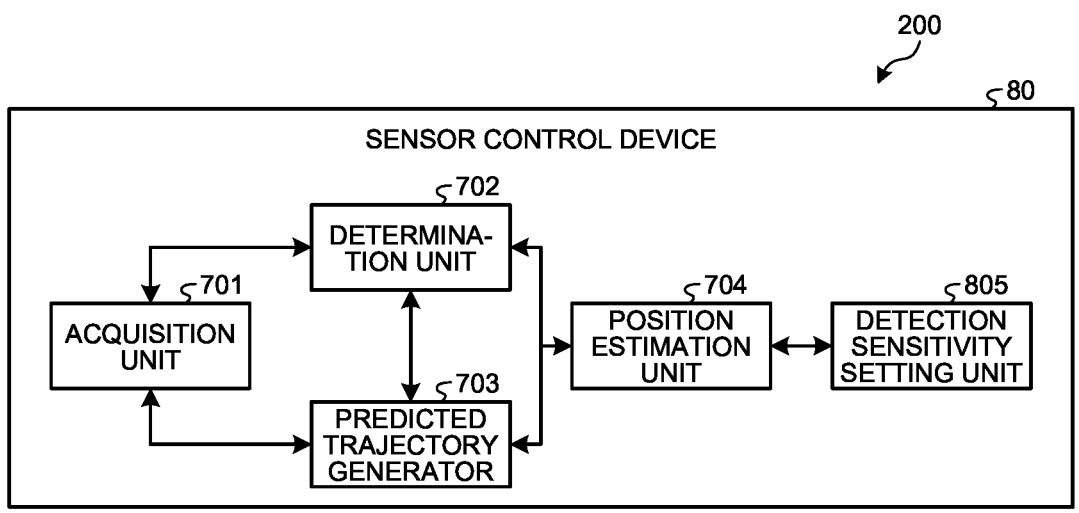

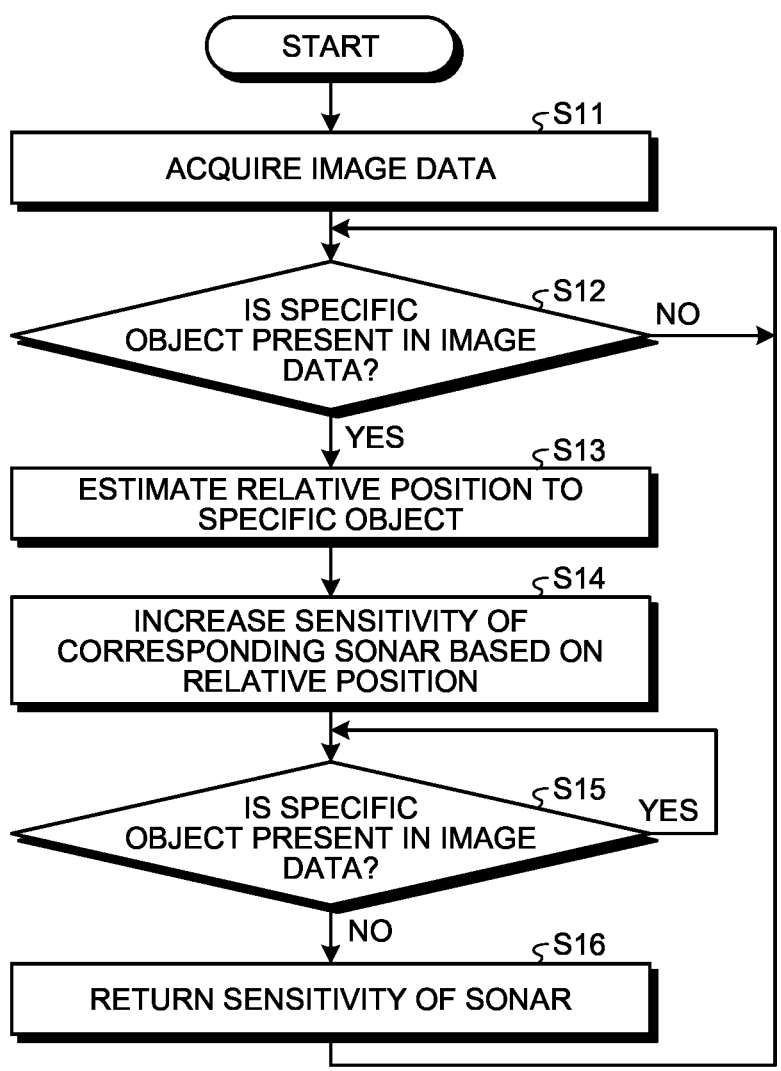

OBJECT DETECTION DEVICE, VEHICLE, METHOD OF SETTING WAVE RECEIVING PERIOD IN OBJECT DETECTION DEVICE, AND METHOD OF SETTING DETECTION SENSITIVITY IN OBJECT DETECTION DEVICE

CROSS-REFERENCE TO RELATED APPLICATIONS

This application is based upon and claims the benefit of priority from Japanese Patent Applications No. 2021-058242, filed on Mar. 30, 2021, and No. 2021-058640, filed on Mar. 30, 2021, the entire contents of which are incorporated herein by reference.

FIELD

Embodiments described herein relate generally to an object detection device, a vehicle, a method of setting a wave receiving period in the object detection device, and a method of setting detection sensitivity in the object detection device.

BACKGROUND

A conventional technology of detecting objects such as a preceding vehicle, obstacles, or pedestrians using ranging sensors such as ultrasonic sensors mounted on a vehicle has been known. There has also been known a technology of performing various control for improving traveling safety of the vehicle, such as operation of automatic braking and notification to a driver, based on object detection results by the ranging sensors.

The pedestrians and the like have been, however, required to be detected with high accuracy in accordance with surrounding conditions of the vehicle because the pedestrians and the like have low reflectance to ultrasonic waves.

The present disclosure provides an object detection device, a vehicle, a method of setting a wave receiving period in the object detection device, and a method of setting detection sensitivity in the object detection device that can detect pedestrians and the like with high accuracy in accordance with surrounding conditions of the vehicle.

SUMMARY

An object detection device according to an aspect of the present disclosure, installed in a vehicle, comprises a plurality of ranging sensors and each including a transmitter configured to transmit ultrasonic waves and a receiver configured to receive reflected waves of the ultrasonic waves transmitted by the transmitter and reflected by an object around the vehicle, and processing circuitry configured to detect the object around the vehicle based on the reflected waves received by the receiver during a wave receiving period until a predetermined period of time elapses from transmission of the ultrasonic waves by the transmitter, wherein the processing circuitry acquires an imaged image imaged by an in-vehicle camera that images surroundings of the vehicle, determines whether a specific object is contained based on the imaged image, and sets the wave receiving period from a first wave receiving period to a second wave receiving period longer than the first wave receiving period when the specific object is determined to be contained in the imaged image.

An object detection device according to another aspect of the present disclosure, installed in a vehicle, comprises a plurality of ranging sensors and each including a transmitter configured to transmit ultrasonic waves and a receiver configured to receive reflected waves of the ultrasonic waves transmitted by the transmitter and reflected by an object around the vehicle, and processing circuitry configured to detect the object around the vehicle based on the reflected waves received by the receiver with previously set detection sensitivity, wherein the processing circuitry acquires an imaged image imaged by an in-vehicle camera that images surroundings of the vehicle, determines whether a specific object is contained based on the imaged image, and sets the detection sensitivity from first detection sensitivity to second detection sensitivity higher than the first detection sensitivity when the specific object is determined to be contained in the imaged image.

A vehicle according to still another aspect of the present disclosure comprises an in-vehicle camera that images surroundings and an object detection device.

A method of setting a wave receiving period in an object detection device according to still another aspect of the present disclosure is a method of setting a wave receiving period in an object detection device installed in a vehicle, wherein the object detection device includes a plurality of ranging sensors each including a transmitter configured to transmit ultrasonic waves and a receiver configured to receive reflected waves of the ultrasonic waves transmitted by the transmitter and reflected by an object around the vehicle, and processing circuitry configured to detect the object around the vehicle based on the reflected waves received by the receiver during a wave receiving period until a predetermined period of time elapses from transmission of the ultrasonic waves by the transmitter, the method of setting the wave receiving period comprising acquiring an imaged image imaged by an in-vehicle camera that images surroundings of the vehicle, determining whether a specific object is contained based on the imaged image, and setting the wave receiving period from a first wave receiving period to a second wave receiving period longer than the first wave receiving period when the specific object is determined to be contained in the imaged image.

A method of setting detection sensitivity in an object detection device according to still another aspect of the present disclosure is a method of setting detection sensitivity in an object detection device installed in a vehicle, wherein the object detection device includes a plurality of ranging sensors each including a transmitter configured to transmit ultrasonic waves and a receiver configured to receive reflected waves of the ultrasonic waves transmitted by the transmitter and reflected by an object around the vehicle, and processing circuitry configured to detect the object around the vehicle based on the reflected waves received by the receiver with previously set detection sensitivity, the method of setting the detection sensitivity comprising acquiring an imaged image imaged by an in-vehicle camera that images surroundings of the vehicle, determining whether a specific object is contained based on the imaged image, and setting the detection sensitivity from first detection sensitivity to second detection sensitivity higher than the first detection sensitivity when the specific object is determined to be contained in the imaged image.

BRIEF DESCRIPTION OF THE DRAWINGS

FIG. 6 is a flowchart illustrating an example of operation of the sensor control device in the first embodiment;

FIG. 7 is a block diagram illustrating an example of the functional configuration of a sensor control device according to a second embodiment; and FIG. 8 is a flowchart illustrating an example of operation of the sensor control device in the second embodiment.

DETAILED DESCRIPTION

First Embodiment

The following describes a first embodiment of an object detection device according to the present disclosure with reference to the drawings. The first embodiment relates to control of a wave receiving period in the object detection device.

Figure 1:
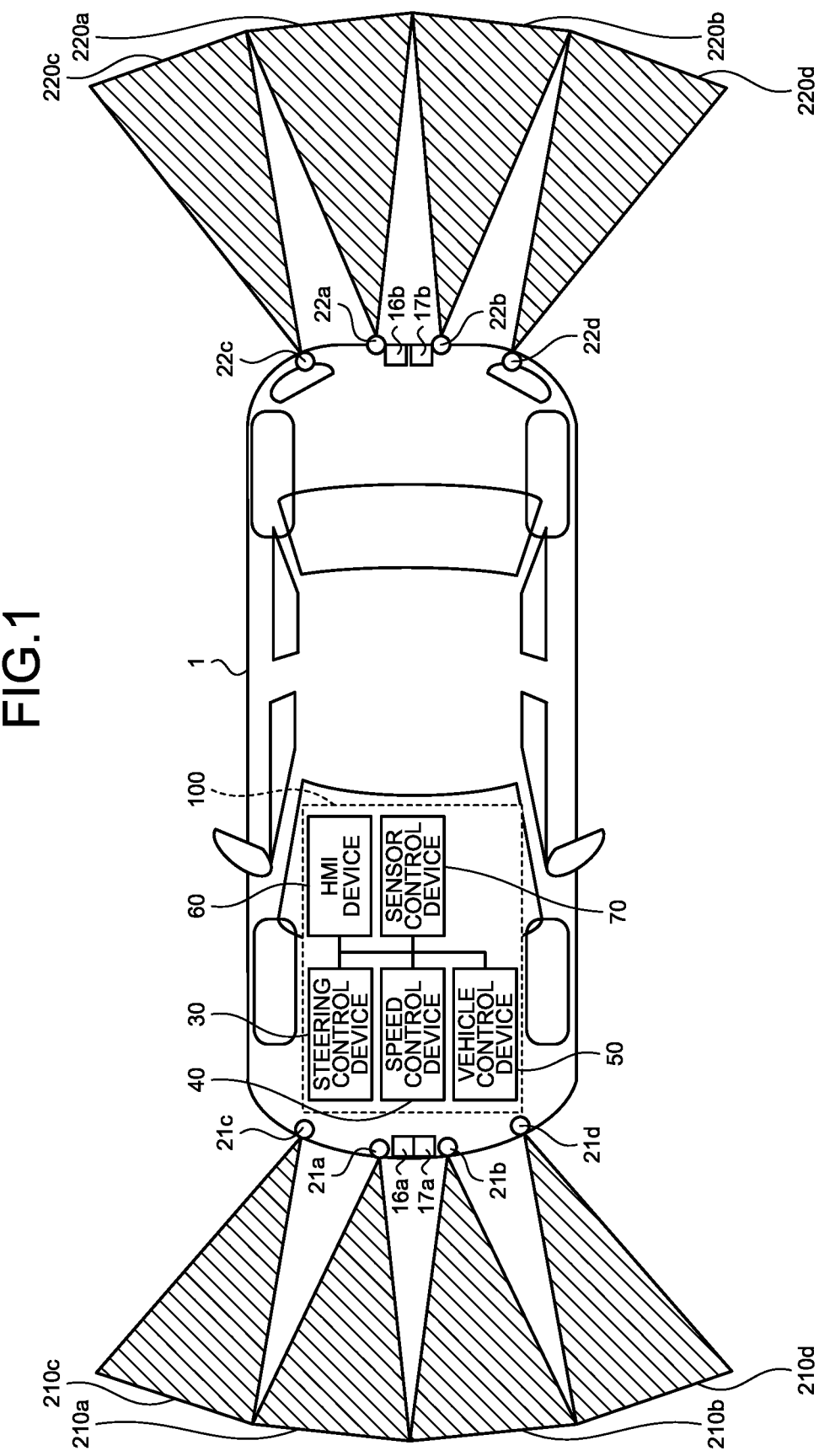
FIG. 1 is a view illustrating an example of the configuration of a vehicle on which an in-vehicle system according to a first embodiment is mounted.

FIG. 1 is a view illustrating an example of the configuration of a vehicle 1 on which an in-vehicle system 100 in the embodiment is mounted. As illustrated in FIG. 1, the vehicle 1 includes a steering control device 30, a speed control device 40, a vehicle control device 50, a human machine interface (HMI) device 60, and a sensor control device 70. The in-vehicle system 100 is an example of an object detection device in the scope of the invention, and the sensor control device 70 is an example of a controller in the scope of the invention.

In the embodiment, the in-vehicle system 100 includes the steering control device 30, the speed control device 40, the vehicle control device 50, the HMI device 60, and the sensor control device 70. Other devices may further be mounted on the vehicle 1. Although the steering control device 30, the speed control device 40, the vehicle control device 50, the HMI device 60, and the sensor control device 70 are illustrated as separate devices in FIG. 1, some or all of these devices may be integrated.

The vehicle 1 includes a plurality of sonars 21a to 21d and 22a to 22d, imaging devices 16a and 16b, and radars 17a and 17b.

The sonars 21a to 21d and 22a to 22d are an example of a plurality of ranging sensors in the embodiment. The sonars 21a to 21d of the sonars 21a to 21d and 22a to 22d are provided in a front end portion of the vehicle 1. The sonars 22a to 22d are provided in a rear end portion of the vehicle 1. Hereinafter, when the individual sonars 21a to 21d and 22a to 22d are not specifically distinguished from each other, they are referred to as sonars 21 and 22. The sonars 21a to 21d are collectively referred to as front sonars 21. The sonars 22a to 22d are collectively referred to as rear sonars 22.

The sonars 21 and 22 are arranged on the vehicle 1 at positions that are advantageous in detecting or ranging surrounding objects. For example, the sonars 21 and 22 are arranged at a distance on bumpers in the front end portion and the rear end portion of the vehicle 1 to detect objects in front of and behind the vehicle 1.

Each of the sonars 21 and 22 is installed on the vehicle 1, emits ultrasonic waves, and measures time taken to receive reflected waves reflected by an object around the vehicle 1, thereby detecting the object around the vehicle 1 and obtaining distance information to the detected object. To be specific, each of the sonars 21 and 22 includes a transmitter configured to transmit the ultrasonic waves and a receiver configured to receive the reflected waves of the ultrasonic waves transmitted by the transmitter and reflected by the object around the vehicle and detects the object around the vehicle based on the reflected waves received by the receiver during a wave receiving period until a predetermined period of time elapses from transmission of the ultrasonic waves by the transmitter.

When referring to the "object" or "obstacle" in the embodiment, it includes pedestrians and other vehicles. The obstacle does not include those that do not hinder traveling of the vehicle 1, such as irregularities of a road surface.

To be more specific, the first front center sonar 21a is provided on the slightly right side of the center in the front end portion of the vehicle 1, and the second front center sonar 21b is provided on the slightly left side of the center in the front end portion of the vehicle 1. The first front corner sonar 21c is provided at a position closer to a right corner than the first front center sonar 21a in the front end portion of the vehicle 1. The second front corner sonar 21d is provided at a position closer to a left corner than the second front center sonar 21b in the front end portion of the vehicle 1.

The first rear center sonar 22a is provided on the slightly right side of the center in the rear end portion of the vehicle 1, and the second rear center sonar 22b is provided on the slightly left side of the center in the rear end portion of the vehicle 1. The first rear corner sonar 22c is provided at a position closer to a right corner than the first rear center sonar 22a in the rear end portion of the vehicle 1. The second rear corner sonar 22d is provided at a position closer to a left corner than the second rear center sonar 22b in the rear end portion of the vehicle 1.

One example of a first ranging sensor in the scope of the invention is the first front corner sonar 21c, and one example of a second ranging sensor in the scope of the invention is the first front center sonar 21a. The configuration in the embodiment is, however, not limited to this. Any of the individual sonars 21a to 21d and 22a to 22d may be used as the first ranging sensor or the second ranging sensor appropriately in accordance with the surrounding conditions.

In FIG. 1, a detection range 210a indicates a range in which the first front center sonar 21a can detect objects, a detection range 210b indicates a range in which the second front center sonar 21b can detect objects, a detection range 210c indicates a range in which the first front corner sonar 21c can detect objects, and a detection range 210d indicates a range in which the second front corner sonar 21d can detect objects. When the individual detection ranges 210a to 210d are not specifically distinguished from each other, they are simply referred to as detection ranges 210.

A detection range 220a indicates a range in which the first rear center sonar 22a can detect objects, a detection range 220b indicates a range in which the second rear center sonar 22b can detect objects, a detection range 220c indicates a range in which the first rear corner sonar 22c can detect objects, and a detection range 220d indicates a range in which the second rear corner sonar 22d can detect objects. When the individual detection ranges 220a to 220d are not specifically distinguished from each other, they are simply referred to as detection ranges 220.

The detection ranges 210 are determined based on the wave receiving periods until the predetermined period of time elapses from transmission of the ultrasonic waves. The wave receiving periods are previously set by the sensor control device 70, but can be modified (updated) for the respective sonars 21 and 22 as appropriate in accordance with the surrounding conditions and vehicle conditions. The method of setting the wave receiving periods will be described later.

Although the detection ranges 210 and 220 are illustrated separately in FIG. 1, the detection ranges 210 and 220 of the adjacent sonars 21 and 22 overlap with each other actually.

When the first front center sonar 21a, the second front center sonar 21b, the first rear center sonar 22a, and the second rear center sonar 22b are not specifically distinguished from each other, they are simply referred to as center sonars 21a, 21b, 22a, and 22b. When the first front corner sonar 21c, the second front corner sonar 21d, the first rear corner sonar 22c, and the second rear corner sonar 22d are not specifically distinguished from each other, they are simply referred to as corner sonars 21c, 21d, 22c, and 22d. Although in the embodiment, specific explanation is hereinafter given while the traveling direction of the vehicle 1 is supposed to be the forward direction mainly as an example, functions exemplified using the front sonars 21 may also be applied to the rear sonars 22.

When the vehicle 1 moves straight forward, the first front center sonar 21a and the second front center sonar 21b on the inner side detect an obstacle located in the traveling direction of the vehicle 1. When the vehicle 1 turns left or right forward, the second front corner sonar 21d or the first front corner sonar 21c detects an object located at a position where the vehicle 1 reaches after turning left or right. When an obstacle enters the right front side of the vehicle 1 from the right lateral side of the vehicle 1, the first front corner sonar 21c or the first front center sonar 21a performs detection first.

The installation places and number of sonars 21 and 22 are not limited to the examples illustrated in FIG. 1. Details of the functions of the sonars 21 and 22 will be described later.

The imaging devices 16a and 16b are cameras that image the surroundings of the vehicle 1. In FIG. 1, the imaging device 16a is provided in the front end portion of the vehicle 1 and can image the surroundings including the front side of the vehicle 1. The imaging device 16b is provided in the rear end portion of the vehicle 1 and can image the surroundings including the rear side of the vehicle 1. The installation places and number of the imaging devices 16a and 16b are not limited to the examples illustrated in FIG. 1.

The imaging device 16b on the rear side is not essential, and only the imaging device 16a may be mounted on the vehicle 1. Hereinafter, when the imaging devices 16a and 16b are not specifically distinguished from each other, they are simply referred to as imaging devices 16. The imaging devices 16 are examples of an in-vehicle camera in the scope of the invention.

The radars 17a and 17b detect objects around the vehicle 1 and measure distances between the objects and the vehicle 1. For example, the radar 17a measures a distance between a preceding vehicle located in front of the vehicle 1 and the vehicle 1. The radar 17b measures a distance between the following vehicle located behind the vehicle 1 and the vehicle 1. When the individual radars 17a and 17b are not distinguished from each other, they are simply referred to as radars 17. The radars 17 emit radio waves such as millimeter waves and receive the radio waves reflected by the objects. The installation places and number of the radars 17 are not limited to the examples illustrated in FIG. 1.

The sonars 21 and 22, the imaging devices 16, and the radars 17 may be collectively referred to as detection devices. The vehicle 1 may further include another detection device such as light detection and ranging or laser imaging detection and ranging (LiDAR). The vehicle 1 may include no radar 17. The vehicle 1 may include an antenna capable of receiving global positioning system (GPS) signals and a GPS device (not illustrated) that identifies GPS coordinates representing the position of the vehicle 1 based on the received GPS signals.

The steering control device 30 controls the steering angle of the vehicle 1. The steering control device 30 is also referred to as a steering angle control device. The steering control device 30 is arranged, for example, at a position that is advantageous in steering assistance in power steering of the vehicle 1.

The speed control device 40 controls acceleration and braking of the vehicle 1. The speed control device 40 is arranged, for example, at a position that is advantageous in controlling an engine or a motor and brakes.

The vehicle control device 50 controls various behaviors of the vehicle 1 and is arranged, for example, near the steering control device 30 and the speed control device 40.

The HMI device 60 includes a display capable of displaying information and a touch panel, a switch, or the like capable of receiving operations by a user. The display and the touch panel may be configured as an integrated device. The display is also referred to as a display unit. The touch panel and the switch are also referred to as an operation unit. The display unit and the operation unit included in the HMI device 60 are arranged around a driver's seat.

The sensor control device 70 controls the sonars 21 and 22. The sensor control device 70 may further control the imaging devices 16 and the radars 17. Alternatively, the above-mentioned vehicle control device 50 may control the imaging devices 16 and the radars 17.

The sensor control device 70 and the sonars 21 and 22 are examples of the object detection device in the embodiment. The sensor control device 70 alone may be used as an example of the object detection device. The object detection device may include the entire in-vehicle system 100 or any of the steering control device 30, the speed control device 40, the vehicle control device 50, and the HMI device 60 included in the in-vehicle system 100.

The steering control device 30, the speed control device 40, the vehicle control device 50, the HMI device 60, and the sensor control device 70 are wired-coupled with a local area network such as a controller area network (CAN). The sonars 21 and 22, the imaging devices 16, and the radars 17 may be coupled to the local area network or may be coupled to the sensor control device 70 or the vehicle control device 50 by dedicated line.

Figure 2:
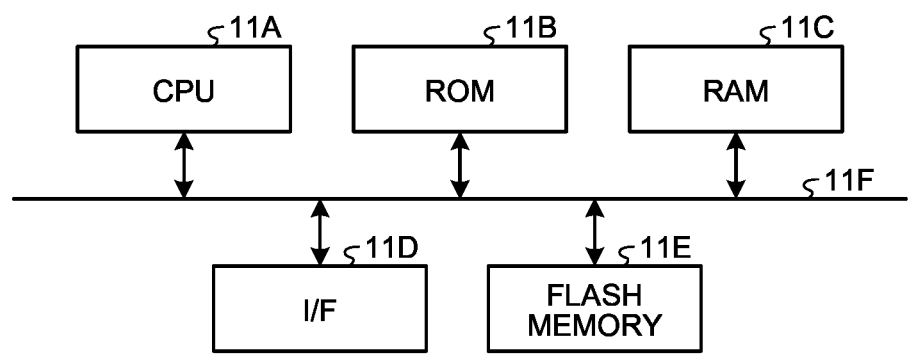
FIG. 2 is a diagram illustrating an example of the hardware configuration of a sensor control device in the first embodiment.

Next, the hardware configuration of the sensor control device 70 will be explained. FIG. 2 is a diagram illustrating an example of the hardware configuration of the sensor control device 70 in the first embodiment. As illustrated in FIG. 2, the sensor control device 70 includes a central processing unit (CPU) 11A, a read-only memory (ROM) 11B, a random-access memory (RAM) 11C, an interface (I/F) 11D, and a flash memory 11E that are coupled to each other via a bus 11F and has the hardware configuration using an ordinary computer.

The CPU 11A is an arithmetic device that controls the entire sensor control device 70. The CPU 11A is an example of processing circuitry, and another processor may be provided in place of the CPU 11A. The ROM 11B stores therein a computer program that realize various pieces of processing by the CPU 11A, and the like. The RAM 11C is, for example, a main storage device of the sensor control device 70 and stores therein data necessary for the various pieces of processing by CPU 11A. The I/F 11D is an interface for transmitting and receiving data. The I/F 11D may also transmit and receive information to and from other devices mounted on the vehicle 1 via the CAN or the like in the vehicle 1. The flash memory 11E is an example of a writable non-volatile storage medium. The ROM 11B, the RAM 11C, and the flash memory 11E are also referred to as a storage unit. The sensor control device 70 may include another storage device such as a hard disk drive (HDD) instead of the flash memory 11E or in addition to the flash memory 11E.

The hardware configuration of each of the steering control device 30, the speed control device 40, the vehicle control device 50, and the HMI device 60 also includes, for example, a processing circuit such as a CPU, a ROM, a RAM, an I/F, and a flash memory.

Figure 3:
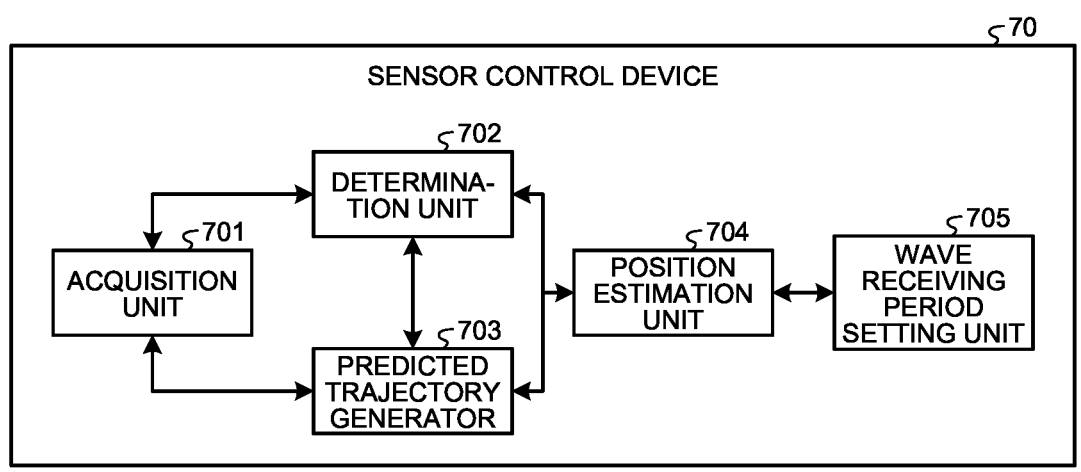
FIG. 3 is a block diagram illustrating an example of the functional configuration of the sensor control device in the first embodiment.

FIG. 3 is a block diagram illustrating an example of the functional configuration of the sensor control device 70 in the first embodiment. As illustrated in FIG. 3, the sensor control device 70 in the embodiment includes an acquisition unit 701, a determination unit 702, a predicted trajectory generator 703, a position estimation unit 704, and a wave receiving period setting unit 705.

The acquisition unit 701 acquires the distance information ranged by the sonars 21 and 22 or the radars 17, vehicle speed information indicating the speed of the vehicle 1, image data provided by the imaging devices 16, and position information indicating the position of the vehicle 1. The acquisition unit 701 is an example of an image acquisition unit in the scope of the invention.

The image data is an example of image information in the embodiment. The acquisition unit 701 may acquire the image data directly from the imaging devices 16 or via the vehicle control device 50.

The determination unit 702 determines whether the image data acquired by the acquisition unit 701 contains a specific object. Examples of the specific object include pedestrians and bicycles. Since such objects have low reflectance to ultrasonic waves, improvement in accuracy of detecting them is required.

Whether the image data contains the specific object may be determined by using a well-known technology in which the image data is processed to detect an image of a pedestrian or the like and the position of the pedestrian or the like is estimated.

The acquisition unit 701 acquires the vehicle speed information from the speed control device 40 or the vehicle control device 50. The acquisition unit 701 may acquire steering information from the steering control device 30.

The position information indicating the position of the vehicle 1 is information in which the position of the vehicle 1 is specified on a map. The position information is, for example, information that the vehicle control device 50 specifies based on information acquired from the GPS device or the like and map information stored in the storage unit of the vehicle control device 50. The methods of generating and acquiring the position information are not particularly limited, and well-known technologies can be used.

The predicted trajectory generator 703 generates a predicted trajectory of the vehicle based on the position information, the steering information, and the speed information of the vehicle that have been acquired by the acquisition unit 701. The generated predicted trajectory may be projected onto the display or a navigation screen mounted on the vehicle. The position information, the steering information, and the speed information are ranged by the above-mentioned GPS device, steering control device 30, and speed control device 40, respectively, or the sonars 21 and 22 or the radars 17.

The predicted trajectory generator 703 is not an essential component of the in-vehicle system 100 in the embodiment.

The position estimation unit 704 estimates a relative position of the specific object to the vehicle 1 based on the position information acquired by the acquisition unit 701 and presence/absence information of the specific object that has been determined by the determination unit 702. The relative position includes at least one of direction information and the distance information of the specific object to the vehicle 1. The direction information and the distance information may be calculated by the determination unit 702 from the image data acquired by the acquisition unit 701 or may be provided by acquiring information calculated by a controller of the imaging device 16 and calculated by the acquisition unit 701.

The position estimation unit 704 may estimate the relative position of the specific object to the vehicle 1 based on the predicted trajectory generated by the predicted trajectory generator 703. Specifically, it determines the relative position of the specific object to the vehicle based on a positional relation between the specific object and a point where the vehicle 1 approaches the specific object (for example, a closest approach point) among the points on the generated predicted trajectory. The predicted trajectory generator 703 may generate the predicted trajectory only when the determination unit 702 determines that the image data contains the specific object.

The wave receiving period setting unit 705 sets the wave receiving periods for the respective sonars 21 and 22. In other words, the wave receiving period setting unit 705 sets the detection ranges 210 of the respective sonars 21 and 22. The detection ranges 210 are determined based on the wave receiving periods until the predetermined period of time elapses from transmission of the ultrasonic waves.

Figure 4:
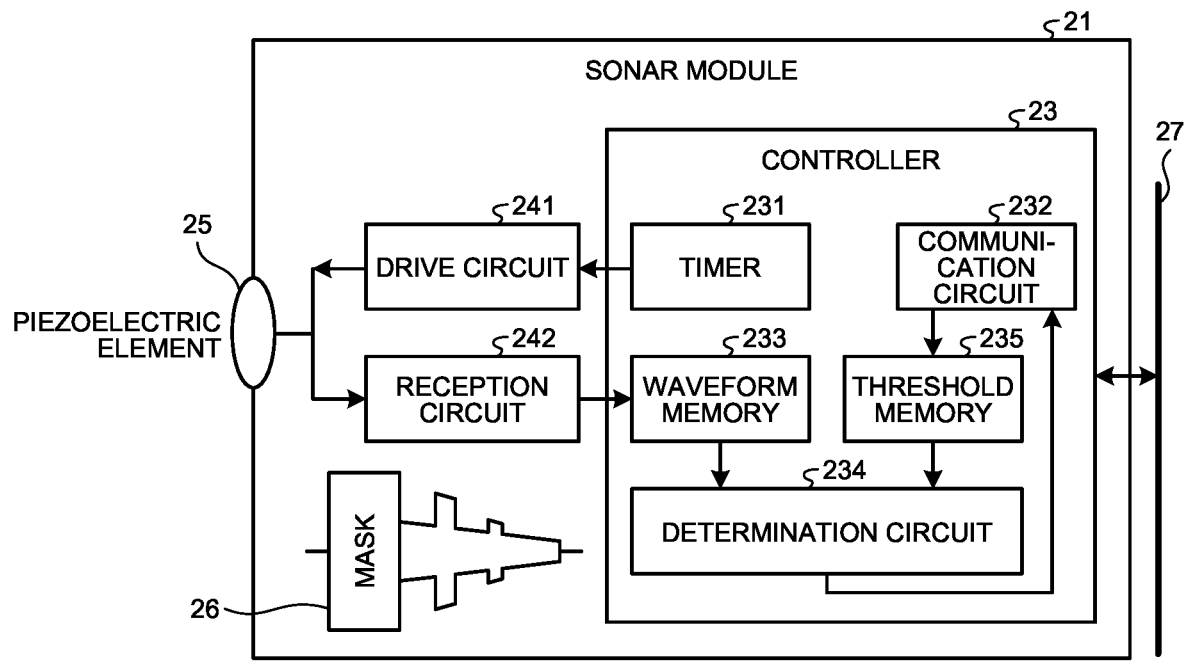
FIG. 4 is a diagram illustrating an example of the configuration of a sonar in the first embodiment.

Next, the details of the sonars 21 and 22 will be explained. FIG. 4 is a diagram illustrating an example of the configuration of the sonars 21 and 22 in the first embodiment. The individual sonars 21 and 22 are also referred to as sonar modules. Each sonar module includes a controller 23, a drive circuit 241, a reception circuit 242, a piezoelectric element 25, and a mask 26. The controller 23 includes a timer 231, a communication circuit 232, a waveform memory 233, a determination circuit 234, and a threshold memory 235. The controller 23 is coupled to the sensor control device 70 via a transmission line 27. The controller 23 may be coupled also to the vehicle control device 50 via the transmission line 27.

Each of the sonars 21 and 22 emits ultrasonic waves when a voltage is applied to the piezoelectric element 25. For example, the controller 23 controls the drive circuit 241 to apply a voltage of 50 KHz to the piezoelectric element 25, so that the piezoelectric element 25 emits the ultrasonic waves of the same frequency. The ultrasonic waves that are emitted are in form of pulses. When the pulsed ultrasonic waves hit a road surface or an obstacle, they are reflected thereby and some of them are returned to the sonar 21 or 22.

The piezoelectric element 25 then converts the sound pressures of the returned reflected waves into voltages. The reception circuit 242 amplifies and rectifies the voltages converted from the sound pressures by the piezoelectric element 25 and converts them into sound wave reception intensities. The time series of the converted sound wave reception intensities is referred to as an "echo waveform".

Figure 5:
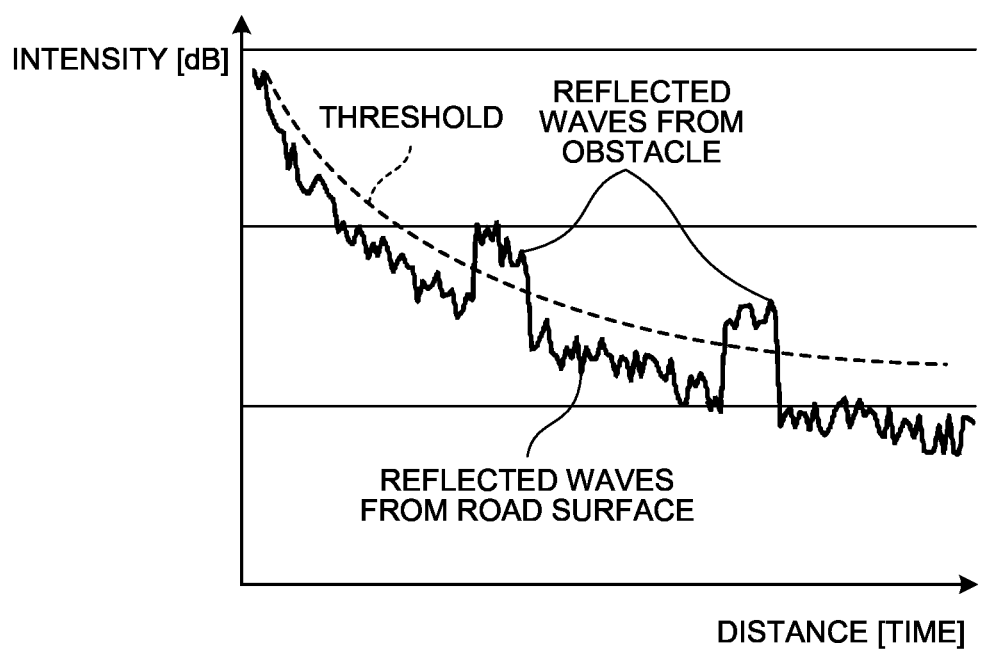
FIG. 5 is a graph illustrating an example of an echo waveform in the first embodiment.

FIG. 5 is a graph illustrating an example of the echo waveform in the first embodiment. The horizontal axis of the graph illustrated in FIG. 5 represents a distance and time, and the vertical axis represents an intensity (dB), that is, the sound wave reception intensity. The echo waveform is stored in the waveform memory 233 of the controller 23.

As the object is farther, time until the ultrasonic waves are returned to the sonar 21 or 22 from emission thereof from the sonar 21 or 22 is longer. The length of time from emission to reception can therefore be converted to the distance to the object from the sonar 21 or 22.

Returning to FIG. 3, the method of setting the wave receiving periods by the wave receiving period setting unit 705 is explained.

The wave receiving period setting unit 705 sets the wave receiving periods for the sonars 21 and 22 from a first wave receiving period to a second wave receiving period longer than the first wave receiving period when the determination unit 702 determines that the image data acquired by the acquisition unit 701 contains the specific object. When the wave receiving periods being periods until the predetermined period of time elapses from transmission of the ultrasonic waves are set to be longer, the detection ranges 210 and 220 are enlarged in accordance therewith.

As described above, when the image data contains the specific object, the sensor control device 70 lengthens the wave receiving periods for the sonars 21 and 22 (increases the detection ranges 210). With this setting, even when the specific object detected by the imaging device 16 is at a position that is too far to be detected by the sonars, the specific object such as a pedestrian can be detected from a distance with high accuracy since wave receiving time for the sonars 21 and 22 is set to be sufficiently long.

When the imaged image is determined to contain the specific object, the sensor control device 70 may lengthen the wave receiving period for only the corresponding sonar among the sonars 21 and 22 based on the relative position of the specific object that the position estimation unit 704 has estimated.

For example, when the specific object is on the front right lateral side of the vehicle 1, the wave receiving period for only the first front corner sonar 21c is set from the first wave receiving period to the second wave receiving period longer than the first wave receiving period. For example, when the specific object is on the front right side facing the vehicle 1, the wave receiving period for only the first front center sonar 21a is set from the first wave receiving period to the second wave receiving period longer than the first wave receiving period.

If the wave receiving period is set to be long, an ultrasonic wave transmission cycle becomes slow and a one obstacle detection cycle (time from transmission of the ultrasonic waves to reception of the reflected waves for detection of an obstacle) becomes longer. As a result, there arises the problem that braking control and the like are slowed to lower responsiveness of the in-vehicle system 100. A pedestrian can be detected with high accuracy while the responsiveness of the in-vehicle system 100 is maintained by lengthening the wave receiving period for only the sonar corresponding to the relative position based on the relative position of a specific object to the vehicle 1 (direction information of the specific object to the vehicle 1) as in the above-mentioned configuration.

The relative position of the specific object to the vehicle 1 is not limited to the above-mentioned direction information of the specific object to the vehicle 1. It may include the distance information from the vehicle 1 to the specific object. The sensor control device 70 calculates the distance information from the image data imaged by the imaging device 16, for example. In the sensor control device 70, the wave receiving period setting unit 705 sets the second wave receiving period so that the specific object is contained in any of the detection ranges 210 and 220 of the sonars 21 and 22 based on the distance information. This setting manner enables reliable detection of the specific object such as a pedestrian while maintaining the responsiveness of the sensor control device 70. The wave receiving period setting unit 705 sets the second wave receiving period based on the distance information or the direction information from the vehicle 1 to the specific object or both of them. The second wave receiving period is longer than the first wave receiving period being the wave receiving period before the determination unit 702 determines that the image data contains the specific object.

The relative position of the specific object to the vehicle 1 may be calculated based on distribution of feature points contained in the image data. For example, the position estimation unit 704 calculates the relative position based on distribution (variation) of edge points related to a predetermined object. This calculation manner enables efficient determination of the relative position of the specific object to the vehicle 1.

Before the determination unit 702 determines (when it has not yet determined) that the image data contains the specific object, the wave receiving period for the first front center sonar 21a (as an example of the second ranging sensor in the scope of the invention) may be set to be longer than that for the first front corner sonar 21c (as an example of the first ranging sensor in the scope of the invention). With this setting, in a state before the determination unit 702 determines (when it has not yet determined) that the image data contains the specific object, the detection range only on the front side facing the vehicle 1 can be widened (the detection range 210a can be made larger than the detection range 210c). This makes it possible to detect an obstacle with high accuracy while maintaining the responsiveness of the in-vehicle system 100. It is desired that the detection range in the direction facing the vehicle be set to be larger than that on the lateral sides of the vehicle. When the determination unit 702 determines that the image data contains the specific object, the sensor control device 70 adjusts the wave receiving periods for the respective sonars 21 and 22 based on the relative position of the specific object to the vehicle 1, thereby enabling efficient detection of an obstacle (including a pedestrian and a bicycle) while maintaining the responsiveness of the in-vehicle system 100.

In the embodiment, the wave receiving period for the second front center sonar 21b may be set to be longer than the wave receiving period for the second front corner sonar 21d and the wave receiving period for the second front center sonar 21b may be set to be longer than the wave receiving period for the first front corner sonar 21c in the state before the determination unit 702 determines (when it has not yet determined) that the image data contains the specific object. The same applies to the rear portion of the vehicle 1. In the state before the determination unit 702 determines (when it does not determine) that the image data contains the specific object, the wave receiving period for the first rear corner sonar 22c may be set to be longer than the wave receiving period for the first rear center sonar 22a. It is sufficient that the first ranging sensor herein is a corner sensor installed near a corner of the vehicle 1 and the second ranging sensor is a center sensor installed near the center of the vehicle 1.

In addition, when the determination unit 702 of the sensor control device 70 determines that the image data contains no specific object after the sensor control device 70 sets the wave receiving period(s) for one or more of the sonars 21 and 22 from the first wave receiving period to the second wave receiving period longer than the first wave receiving period (after the determination unit 702 determines that the image data contains the specific object), the wave receiving period(s) for the sonar(s) 21 and/or 22 for which the second wave receiving period has been set may be set to a third wave receiving period shorter than the second wave receiving period. With this setting, when the object such as a pedestrian is once detected, and then, the specific object is not detected, the wave receiving period(s) is(are) reset to a shorter period, thereby enabling improvement of the responsiveness of the in-vehicle system 100 when the specific object such as the pedestrian is not detected.

The third wave receiving period may be the first wave receiving period being the wave receiving period before the specific object is detected (before the determination unit 702 determines that the image data contains the specific object). Only the wave receiving period for the first ranging sensor (for example, the first front corner sonar 21*c*) installed near the corner of the vehicle 1 among the sonars 21 and 22 may be set to be short. The wave receiving period for a corresponding sonar among the sonars 21 and 22 may be shortened (to the third wave receiving period) based on the relative position of the specific object that the position estimation unit 704 has estimated in detection of the specific object similarly to the case when the specific object is detected (when the determination unit 702 determines that the image data contains the specific object).

Next, operation of controlling the wave receiving periods by the sensor control device 70 will be explained. FIG. 6 is a flowchart illustrating an example of the operation of the sensor control device 70 in the first embodiment.

The operation of the sensor control device 70 starts, for example, when the engine of the vehicle 1 is turned on (or when the ignition is turned on).

First, the acquisition unit 701 in the sensor control device 70 acquires image data imaged by the imaging devices 16 at step S1. The acquired image data is sent to the determination unit 702. The acquisition unit 701 may continue acquiring the image data imaged by the imaging devices 16 or it may acquire the image data every predetermined period of time.

Then, the flowchart moves to step S2. The determination unit 702 determines whether a specific object is present in the image data at step S2. The specific object is an object that has low reflectance of ultrasonic waves and to which special attention for detection needs to be paid, such as a pedestrian and a bicycle.

When the determination unit 702 determines that the specific object is present in the image data (Yes at step S2), the flowchart moves to step S3. When the determination unit 702 determines that no specific object is present in the image data (No at step S2), the flowchart returns to the step before step S2.

The position estimation unit 704 calculates the relative position of the specific object to the vehicle 1 at step S3. The relative position is as described above in terms of the point that it includes the direction information and/or the distance information of the specific object to the vehicle 1. The position estimation unit 704 may calculate the relative position based on, instead of the current position of the vehicle 1, the predicted trajectory of the vehicle 1 that the predicted trajectory generator 703 generates. The position estimation unit 704 sends, to the wave receiving period setting unit 705, the calculated relative position information of the specific object to the vehicle 1. The flowchart moves to step S4.

At step S4, the wave receiving period setting unit 705 sets the wave receiving period for the corresponding sonar 21 or 22 to lengthen from the first wave receiving period to the second wave receiving period, based on the relative position information of the specific object to the vehicle 1 that the position estimation unit 704 has calculated.

As described above, for example, when the specific object is on the front right lateral side of the vehicle 1, the wave receiving period for only the first front corner sonar 21*c* is set from the first wave receiving period to the second wave receiving period longer than the first wave receiving period. The specific object can be detected efficiently with high accuracy while the responsiveness of the in-vehicle system 100 is maintained by lengthening the wave receiving period for only the specific sonar 21 or 22 among the sonars 21 and 22 based on the relative position of the specific object.

Step S3 is not essential in the embodiment. When the determination unit 702 determines that the specific object is present in the image data, the wave receiving periods for the sonars 21 and 22 may be lengthened without calculating the relative position between the vehicle 1 and the specific object. In this case, the wave receiving period setting unit 705 may set and lengthen the wave receiving periods for all of the sonars 21 and 22 or the wave receiving periods for some of the sonars 21 and 22. After the wave receiving period setting unit 705 sets and lengthens the wave receiving period(s) for the sonar(s) 21 and/or 22, the flowchart moves to step S5.

The determination unit 702 determines whether a specific object is present in the image data at step S5. When the determination unit 702 determines that the specific object is present in the image data (Yes at step S5), the flowchart returns to the step before step S5.

When the determination unit 702 determines that the specific object is present in the image data (No at step S5), the flowchart moves to step S6 and the wave receiving period setting unit 705 returns, to the original value (the first wave receiving period), the wave receiving period(s) for the sonar(s) 21 and/or 22 that has(have) been set to be lengthened. It is sufficient that the wave receiving period setting unit 705 sets the wave receiving period(s) for the sonar(s) 21 and/or 22 to a value shorter than the second wave receiving period at step S6, and the value is not limited to the first wave receiving period.

It is further sufficient that the wave receiving periods for multiple or some sonars among the sonars 21 and 22 are set to be shortened, and the wave receiving periods for the sonars other than the sonar(s) 21 and/or 22 for which the wave receiving period(s) has(have) been set to be lengthened at step S4 may be shortened. Step S5 and step S6 are not essential in the embodiment.

The operation of the sensor control device 70 is terminated, for example, when the engine is turned off (or the ignition is turned off).

The configuration of the in-vehicle system 100 in the embodiment can detect a specific object such as a pedestrian with high accuracy by controlling the wave receiving periods for the sonars 21 and 22 in accordance with the surrounding conditions of the vehicle when the determination unit 702 determines that the specific object is present in the image data. Furthermore, the specific object such as the pedestrian can be detected efficiently with high accuracy while the responsiveness of the in-vehicle system 100 is maintained by controlling the wave receiving period for the corresponding sonar 21 or 22 based on the relative position of the specific object to the vehicle 1.

Second Embodiment

The following describes a second embodiment of an object detection device according to the present disclosure with reference to the drawings. In an in-vehicle system 200 in the embodiment, the configuration of the vehicle 1 (except for the in-vehicle system 200), the configuration of the sonars 21 and 22, and the principle of obstacle detection in the sonars 21 and 22 are the same as those in the in-vehicle system 100 in the first embodiment, and explanation thereof is therefore omitted. In the in-vehicle system 200 in the embodiment, the same reference numerals denote the same components as those of the in-vehicle system 100 in the first embodiment, and explanation thereof is omitted. The first embodiment relates to control of sensitivity of the object detection device.

The in-vehicle system 200 in the embodiment differs from the in-vehicle system 100 in the first embodiment in the configuration of a sensor control device 80 and control of the sensor control device 80 when the determination unit 702 determines that image data acquired by the acquisition unit 701 contains a specific object. Specifically, the sensor control device 80 controls sensitivities of the sonars 21 and 22 instead of control of the wave receiving periods for the sonars 21 and 22.

FIG. 7 is a block diagram illustrating an example of the functional configuration of the sensor control device in the second embodiment. As illustrated in FIG. 7, the sensor control device 80 in the embodiment includes the acquisition unit 701, the determination unit 702, the predicted trajectory generator 703, the position estimation unit 704, and a detection sensitivity setting unit 805.

The functions of the acquisition unit 701, the determination unit 702, the predicted trajectory generator 703, and the position estimation unit 704 are the same as those in the first embodiment, and explanation thereof is therefore omitted.

The detection sensitivity setting unit 805 sets detection sensitivities of the respective sonars 21 and 22. The detection sensitivity setting unit 805 adjusts the detection sensitivities by controlling detection thresholds of the sonars 21 and 22 or by controlling reception gains of the sonars 21 and 22. Specifically, the detection sensitivities can be increased by lowering the detection thresholds of the sonars 21 and 22 or by increasing the reception gains of the sonars 21 and 22.

The detection threshold is a threshold for determining whether an obstacle is detected when the sensor control device 80 detects the obstacle around the vehicle 1 based on received reflected waves. When the received reflected wave is higher than the threshold, it is determined that the obstacle is present whereas when it is lower than the threshold, it is determined that no obstacle is present. Accordingly, the detection sensitivity of the sensor control device 80 can be increased by setting the detection thresholds to be low.

The reception gain is amplification of the reflected waves received by the receiver of each of the sonars 21 and 22. Even an obstacle with low reflectance and an obstacle at a farther position can be detected by amplifying weak reflected waves with which detection is difficult, and then, performing obstacle determination. In other words, increase in the amplification of the reflected waves increases the reception gain, and decrease in the amplification of the reflected waves decreases the reception gain. Accordingly, the detection sensitivity of the sensor control device 80 can be increased by increasing the reception gains.

The method of setting the detection sensitivities by the detection sensitivity setting unit 805 will be explained.

The detection sensitivity setting unit 805 sets the wave receiving periods for the sonars 21 and 22 from first detection sensitivity to second detection sensitivity higher than the first detection sensitivity when the determination unit 702 determines that the image data acquired by the acquisition unit 701 contains the specific object.

The sensor control device 80 thus increases the detection sensitivities of the sonars 21 and 22 when the image data contains the specific object, thereby enabling detection of the specific objects such as pedestrians with low reflectance with high accuracy without including objects that need not to be detected as detection targets.

When an imaged image is determined to contain the specific object, the sensor control device 80 may increase the detection sensitivity of only a corresponding sonar among the sonars 21 and 22 based on the relative position of the specific object that the position estimation unit 704 has estimated.

For example, when the specific object is on the front right lateral side of the vehicle 1, the detection sensitivity of only the first front corner sonar 21c is set from the first detection sensitivity to the second detection sensitivity higher than the first detection sensitivity. For example, when the specific object is on the front right side facing the vehicle 1, the detection sensitivity of only the first front center sonar 21a is set from the first detection sensitivity to the second detection sensitivity higher than the first detection sensitivity.

If the detection sensitivities are set to be high uniformly, even objects that need not to be detected are included as the detection targets, resulting in a problem of increase in erroneous detection. Even a specific object with low reflectance such as a pedestrian and a bicycle can be detected with high accuracy by increasing the detection sensitivity of only the sonar corresponding to the relative position based on the relative position of the specific object to the vehicle 1 (directional information of the specific object to the vehicle 1) as in the above-mentioned configuration.

The relative position of the specific object to the vehicle 1 is not limited to the above-mentioned direction information of the specific object to the vehicle 1. It may include the distance information from the vehicle 1 to the specific object.

The relative position of the specific object to the vehicle 1 may be calculated based on distribution of feature points contained in the image data. For example, the position estimation unit 704 calculates the relative position based on distribution (variation) of edge points related to the specific object. This calculation manner enables efficient determination of the relative position of the specific object to the vehicle 1.

The position estimation unit 704 may calculate the relative position of the specific object to the vehicle 1 by calculating the coordinates of the specific object by direct wave detection in which the first front corner sonar 21c (as an example of the first ranging sensor in the scope of the invention) transmits ultrasonic waves and the first front corner sonar 21c itself receives the reflected waves. A well-known technology is used for the method of calculating the coordinates. For example, the coordinates of an obstacle can be identified by performing the direct wave detection on the same obstacle (specific object) multiple times at different time points. Although the first front corner sonar 21c is used as an example of the first ranging sensor in the scope of the invention, the embodiment is not limited thereto. Another sonar 21 or 22 may be used to calculate the coordinates of the specific object.

Indirect wave detection may be used instead of the direct wave detection to calculate the coordinates of the specific object. The indirect wave detection is a detection manner in which the first front corner sonar 21c (as an example of the first ranging sensor in the scope of the invention) transmits the ultrasonic waves and the first front center sonar 21a (as an example of the second ranging sensor in the scope of the invention) receives them. Although the first front corner sonar 21c is used as the example of the first ranging sensor in the scope of the invention, the embodiment is not limited thereto. Another sonar 21 or 22 may be used to calculate the coordinates of the specific object. Although the first front center sonar 21a is used as an example of the second ranging sensor, the embodiment is not limited thereto. The indirect wave detection can be performed using, as the second ranging sensor, any of the sonars 21 and 22 other than the first ranging sensor.

The coordinates of the specific object may be calculated by combining the above-mentioned direct wave detection and indirect wave detection. This calculation manner eliminates the necessity of performing detection on the same obstacle (specific object) multiple times at different time points.

With detection of the coordinates of the specific object and increase in the detection sensitivity of the sonar 21 or 22 (for example, the first front corner sonar 21c) within a predetermined range including the coordinates of the specific object, an accurate position of the specific object can be grasped to thereby detect a pedestrian or the like with higher accuracy, and the detection sensitivities are not increased at unnecessary places to thereby reduce erroneous detection.

For example, as compared to the case where only the distance information is used for the relative position, when the detection sensitivity is increased based on the distance information, the detection sensitivity is increased in a set area (concentric area) with the same degree of distance from the vehicle 1 even with no pedestrian and the like. When there is an obstacle in a range with the same distance from the vehicle 1, the detection sensitivity for the obstacle is also increased, resulting in increase in erroneous detection.

To be specific, for example, when an unnecessary object such as a curb is present in another direction with the same degree of distance as the distance to the specific object from the vehicle 1, the detection sensitivity for the specific object increases and the detection sensitivity for the unnecessary object also increases. The risk therefore arises that the curb being not originally a brake control target is mistakenly detected as an obstacle.

By contrast, this configuration enables increase in the detection sensitivity in only a predetermined range including the coordinates of the specific object because the accurate position of the specific object is calculated with direct waves or indirect waves, and then, the detection sensitivity of the corresponding sonar 21 or 22 is increased. As a result, the specific object can be detected with high accuracy without increasing erroneous detection.

In addition, when the determination unit 702 of the sensor control device 80 determines that the image data contains no specific object after the sensor control device 80 sets the detection sensitivity(ies) of one or more of the sonars 21 and 22 from the first detection sensitivity to the second detection sensitivity higher than the first detection sensitivity (after the determination unit 702 determines that the image data contains the specific object), the detection sensitivity(ies) of the sonar(s) 21 or 22 to which the second detection sensitivity has been set may be set to third detection sensitivity lower than the second detection sensitivity. With this setting, when an object such as a pedestrian is once detected, and then, the specific object is not detected, the detection sensitivity is reset to be low, thereby reducing erroneous detection in obstacle detection when the specific object such as the pedestrian is not detected.

The third detection sensitivity may be the first detection sensitivity being the detection sensitivity before the specific object is detected (before the determination unit 702 determines that the image data contains the specific object). Only the detection sensitivity of the first ranging sensor (for example, the first front corner sonar 21c) installed near the corner of the vehicle 1 among the sonars 21 and 22 may be set to be low. The detection sensitivity of the corresponding sonar among the sonars 21 and 22 may be set to be lowered (to the third detection sensitivity) based on the relative position of the specific object that the position estimation unit 704 has estimated in detection of the specific object similarly to the case when the specific object is detected (when the determination unit 702 determines that the image data contains the specific object).

Next, operation of controlling the detection sensitivities by the sensor control device 80 will be described. FIG. 8 is a flowchart illustrating an example of the operation of the sensor control device 80 in the second embodiment.

The operation of the sensor control device 80 starts, for example, when the engine of the vehicle 1 is turned on (or when the ignition is turned on).

First, the acquisition unit 701 in the sensor control device 80 acquires the image data imaged by the imaging devices 16 at step S11. The acquired image data is sent to the determination unit 702. The acquisition unit 701 may continue acquiring the image data imaged by the imaging devices 16 or it may acquire the image data every predetermined period of time.

Then, the flowchart moves to step S12. The determination unit 702 determines whether a specific object is present in the image data at step S12. The specific object is an object that has low reflectance of ultrasonic waves and to which special attention for detection needs to be paid, such as a pedestrian and a bicycle.

When the determination unit 702 determines that the specific object is present in the image data (Yes at step S12), the flowchart moves to step S13. When the determination unit 702 determines that no specific object is present in the image data (No at step S12), the flowchart returns to the step before step S12.

The position estimation unit 704 calculates the relative position of the specific object to the vehicle 1 at step S13. The relative position is as described above in terms of the point that it includes the direction information and/or the distance information of the specific object to the vehicle 1. The position estimation unit 704 may calculate the relative position based on, instead of the current position of the vehicle 1, the predicted trajectory of the vehicle 1 that the predicted trajectory generator 703 generates. The predicted trajectory is generated based on position information, steering information, and speed information of the vehicle 1.

The position estimation unit 704 may calculate the relative position of the specific object to the vehicle 1 by calculating the coordinates of the specific object by the direct wave detection or the indirect wave detection by the sonar 21 or 22 as described above. This calculation manner enables increase in the detection sensitivity in the predetermined range including the specific object. The position estimation unit 704 sends, to the detection sensitivity setting unit 805, the calculated relative position information of the specific object to the vehicle 1. The flowchart moves to step S14.

At step S14, the detection sensitivity setting unit 805 sets the detection sensitivity of the corresponding sonar 21 or 22 to increase from the first detection sensitivity to the second detection sensitivity, based on the relative position information of the specific object to the vehicle 1 that the position estimation unit 704 has calculated.

As described above, for example, when the specific object is on the front right lateral side of the vehicle 1, the detection sensitivity of only the first front corner sonar 21*c* is set from the first detection sensitivity to the second detection sensitivity higher than the first detection sensitivity. The detection sensitivity of only the specific sonar 21 or 22 among the sonars 21 and 22 is increased based on the relative position of the specific object, thereby enabling reduction of erroneous detection without including objects that need not to be detected as the detection targets and detection of a specific object such as a pedestrian with low reflectance with high accuracy.

Step S13 is not essential in the embodiment. When the determination unit 702 determines that the specific object is present in the image data, the detection sensitivities of the sonars 21 and 22 may be increased without calculating the relative position between the vehicle 1 and the specific object. In this case, the detection sensitivity setting unit 805 may set and increase the detection sensitivities of all of the sonars 21 and 22 or the detection sensitivities of some of the sonars 21 and 22. After the detection sensitivity setting unit 805 sets and increases the detection sensitivity(ies) of the sonar(s) 21 and/or 22, the flowchart moves to step S15.

The determination unit 702 determines whether a specific object is present in the image data at step S15. When the determination unit 702 determines that the specific object is present in the image data (Yes at step S15), the flowchart returns to the step before step S15.

When the determination unit 702 determines that the specific object is present in the image data (No at step S15), the flowchart moves to step S16 and the detection sensitivity setting unit 805 returns, to the original value (the first detection sensitivity), the detection sensitivity(ies) of the sonar(s) 21 and/or 22 that has(have) been set to be increased. It is sufficient that the detection sensitivity setting unit 805 sets the detection sensitivity(ies) of the sonar(s) 21 and/or 22 to a value lower than the second detection sensitivity at step S16, and the value is not limited to the first detection sensitivity.

It is further sufficient that the wave reception sensitivity(ies) of multiple or some sonars 21 and 22 is(are) set to be low, and the detection sensitivities of sonars other than the sonar(s) 21 and/or 22 for which the detection sensitivity(ies) has(have) been set to be increased at step S14 may be lowered. Step S15 and step S16 are not essential in the embodiment.

The operation of the sensor control device 80 is terminated, for example, when the engine is turned off (or the ignition is turned off).

The configuration of the in-vehicle system 200 in the embodiment can detect the specific object such as a pedestrian with low reflectance with high accuracy by controlling the detection sensitivity(ies) of the sonar(s) 21 and/or 22 in accordance with the surrounding conditions of the vehicle when the determination unit 702 determines that the specific object is present in the image data. Furthermore, the specific object such as the pedestrian can be detected efficiently with high accuracy while erroneous detection is reduced by controlling the detection sensitivity of the corresponding sonar 21 or 22 based on the relative position of the specific object to the vehicle 1.

With the object detection device, the vehicle, the method of setting the wave receiving period in the object detection device, and the method of setting the detection sensitivity in the object detection device according to the present disclosure, pedestrians and the like can be detected with high accuracy by setting the wave receiving period in the object detection device appropriately in accordance with surrounding conditions of the vehicle.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An object detection device configured to be mounted on a vehicle, comprising:
   a plurality of ranging sensors and each including a transmitter which, in operation, transmits ultrasonic waves, and a receiver which, in operation, receives reflected waves of the ultrasonic waves transmitted by the transmitter and reflected by an object around the vehicle, and
   processing circuitry which, in operation, detects the object around the vehicle based on the reflected waves received by the receiver during a wave receiving period until a predetermined period of time elapses from transmission of the ultrasonic waves by the transmitter, wherein
   the processing circuitry
      acquires an imaged image imaged by an in-vehicle camera that images surroundings of the vehicle,
      determines whether a specific object is contained based on the imaged image,
      estimates a relative position of the specific object to the vehicle when the specific object is determined to be contained in the imaged image, and
      sets the wave receiving period from a first wave receiving period to a second wave receiving period longer than the first wave receiving period for a first ranging sensor among the plurality of ranging sensors based on the estimated relative position of the specific object, and
   the relative position includes direction information of the specific object relative to the vehicle, and
   the processing circuitry which, in operation, selects the first ranging sensor among the plurality of ranging sensors based on the direction information and sets, to the second wave receiving period, the wave receiving period for the first ranging sensor.

2. The object detection device according to claim 1, wherein
   the relative position includes distance information of the specific object to the vehicle, and
   the processing circuitry which, in operation, sets the second wave receiving period so that the specific object is contained in detection ranges of the ranging sensors based on the distance information.

3. The object detection device according to claim 1, wherein
the processing circuitry which, in operation,
further generates a predicted trajectory of the vehicle, and
determines the relative position of the specific object to the vehicle based on a positional relation between the specific object and a point where the vehicle approaches the specific object among points on the generated predicted trajectory.

4. The object detection device according to claim 3, wherein the processing circuitry which, in operation, generates the predicted trajectory based on position information, speed information, and steering information of the vehicle.

5. The object detection device according to claim 1, wherein the processing circuitry which, in operation, estimates the relative position of the specific object based on distribution of feature points related to the specific object in the imaged image when the specific object is determined to be contained in the imaged image.

6. The object detection device according to claim 1, wherein
the first ranging sensor is a corner sensor installed near a corner of the vehicle,
a second ranging sensor among the plurality of ranging sensors is a center sensor installed near a center of the vehicle, and
when the processing circuitry which, in operation, does not determine that the specific object is contained in the imaged image, the wave receiving period for the second ranging sensor is set to be longer than the wave receiving period for the first ranging sensor.

7. The object detection device according to claim 1, wherein when no specific object is determined to be contained in the imaged image after the wave receiving period is set from the first wave receiving period to the second wave receiving period longer than the first wave receiving period, the processing circuitry which, in operation, sets the wave receiving period from the second wave receiving period to a third wave receiving period shorter than the second wave receiving period.

8. The object detection device according to claim 7, wherein the processing circuitry which, in operation, sets, to the third wave receiving period, the wave receiving period for the first ranging sensor among the ranging sensors based on the estimated relative position of the specific object.

9. The object detection device according to claim 7, wherein the third wave receiving period is the same period as the first wave receiving period.

10. The object detection device according to claim 1, wherein the specific object is a pedestrian or a bicycle.

11. A vehicle comprising:
an in-vehicle camera which, in operation, images surroundings of the vehicle; and
an object detection device mounted on the vehicle and comprising:
a plurality of ranging sensors and each including a transmitter which, in operation, transmits ultrasonic waves, and a receiver which, in operation, receives reflected waves of the ultrasonic waves transmitted by the transmitter and reflected by an object around the vehicle, and
processing circuitry which, in operation, detects the object around the vehicle based on the reflected waves received by the receiver during a wave receiving period until a predetermined period of time elapses from transmission of the ultrasonic waves by the transmitter, wherein
the processing circuitry
acquires an imaged image imaged by the in-vehicle camera,
determines whether a specific object is contained based on the imaged image,
estimates a relative position of the specific object to the vehicle when the specific object is determined to be contained in the imaged image, and
sets the wave receiving period from a first wave receiving period to a second wave receiving period longer than the first wave receiving period for a first ranging sensor among the plurality of ranging sensors based on the estimated relative position of the specific object,
the relative position includes direction information of the specific object relative to the vehicle, and
the processing circuitry which, in operation, selects the first ranging sensor based on the direction information and sets, to the second wave receiving period, the wave receiving period for the first ranging sensor.

12. A method of setting a wave receiving period in an object detection device mounted on a vehicle and having a plurality of ranging sensors using ultrasonic waves, the method of setting the wave receiving period comprising:
acquiring an imaged image imaged by an in-vehicle camera that images surroundings of the vehicle;
determining that a specific object is contained based on the imaged image;
estimating a relative position of the specific object to the vehicle when the specific object is determined to be contained in the imaged image;
setting the wave receiving period from a first wave receiving period to a second wave receiving period longer than the first wave receiving period for a first ranging sensor among the plurality of ranging sensors based on the estimated relative position of the specific object, wherein the relative position includes direction information of the specific object relative to the vehicle, and
selecting the first ranging sensor among the plurality of ranging sensors based on the direction information; and
setting, to the second wave receiving period, the wave receiving period for the first ranging sensor.

13. The method of setting the wave receiving period in the object detection device according to claim 12, wherein
the relative position includes distance information of the specific object to the vehicle,
the second wave receiving period is set on the first ranging sensor based on the distance information, and
the specific object is contained in detection ranges of the first ranging sensor.

14. The method of setting the wave receiving period in the object detection device according to claim 12, further comprising:
generating a predicted trajectory of the vehicle; and
determining the relative position of the specific object to the vehicle based on a positional relation between the specific object and a point where the vehicle approaches the specific object among points on the generated predicted trajectory.

15. The method of setting the wave receiving period in the object detection device according to claim 12, further comprising:

estimating the relative position of the specific object based on distribution of feature points related to the specific object in the imaged image when the specific object is determined to be contained in the imaged image.

16. The method of setting the wave receiving period in the object detection device according to claim 12, wherein
the first ranging sensor is a corner sensor installed near a corner of the vehicle,
a second ranging sensor among the plurality of ranging sensors is a center sensor installed near a center of the vehicle, and
when the specific object is determined not to be contained in the imaged image, the wave receiving period for the second ranging sensor is set to be longer than the wave receiving period for the first ranging sensor.

17. The method of setting the wave receiving period in the object detection device according to claim 12, further comprising:
when no specific object is determined to be contained in the imaged image after the wave receiving period is set from the first wave receiving period to the second wave receiving period, setting the wave receiving period from the second wave receiving period to a third wave receiving period shorter than the second wave receiving period.

18. The method of setting the wave receiving period in the object detection device according to claim 12, wherein the specific object is a pedestrian or a bicycle.

\* \* \* \* \*